Aug. 22, 1950 E. TUTTLE 2,519,612
FISHING ROD HOLDER
Filed June 23, 1947

INVENTOR
EARL TUTTLE
BY
ATTORNEYS

Patented Aug. 22, 1950

2,519,612

UNITED STATES PATENT OFFICE 2,519,612

FISHING ROD HOLDER

Earl Tuttle, Fond du Lac, Wis.

Application June 23, 1947, Serial No. 756,449

1 Claim. (Cl. 248—38)

My invention refers to fishing pole supports and has for its primary object to provide an unchorage stem and fishing pole supporting arm frictionally adjustable upon the stem, the said arm being provided with oppositely disposed open loops for engagement with the shank of a pole and an intermediate eye or loop for encircling the stem and by the weight of the pole exert a leverage upon the arm to firmly grip the stem in any predetermined adjusted position.

With the above objects in view my invention consists in certain peculiarities of construction and combination of parts as will be hereinafter fully set forth with reference to the accompanying drawings and subsequently claimed.

Figure 1:
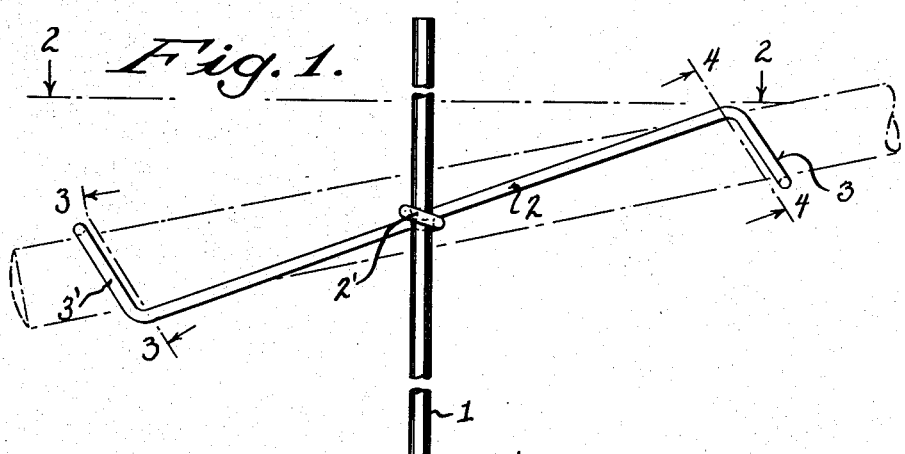
Figure 1 represents a side elevation of a fish pole holder embodying the features of my invention.
Figure 3:
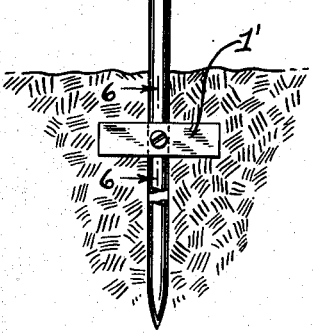
Figure 3 is a cross sectional detailed view illustrating the rear upwardly extended loop of a pole supporting arm, the section being indicated by line 3—3 of Figure 1.
Figure 4:
Figure 4 is a similar detail cross sectional view of the arm illustrating the front downwardly extended loop, the section being indicated by line 4—4 of Figure 1.

Referring by characters to the drawing, 1 indicates a supporting stem, the pointed anchored end thereof being provided with a baffle plate 1' secured to said stem, whereby when the stem is imbedded in the sand this baffle plate will hold said stem against twisting, thus insuring a proper anchorage of the same.

Mounted upon the stem is a pole or rod holding arm 2 having its front end bowed downwardly to form a supporting loop 3 and with its rear end being bowed upwardly to form an open loop 3', whereby a pole, as indicated in dotted lines is conveniently seated within said arm loops and due to the weight of the pole the same will be securely held therein.

Figure 2:
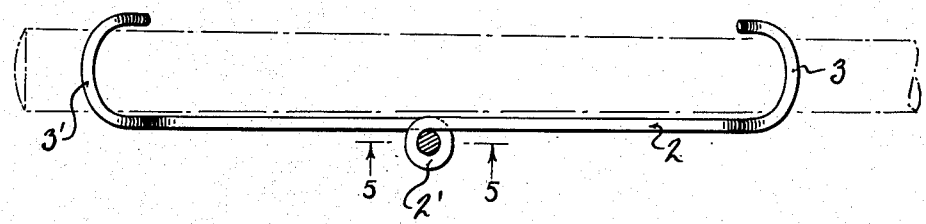
Figure 2 is a partial sectional plan view, the section being indicated by line 2—2 of Figure 1.
Figures 5, 7:
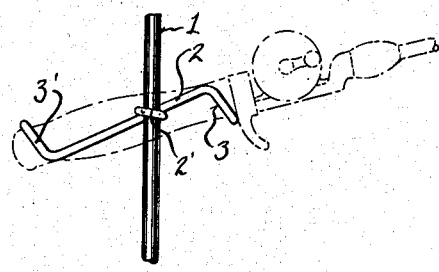
Figure 5 is a magnified detailed sectional view through the friction gripping loop of said arm in conjunction with the stem, the section being indicated by line 5—5 of Figure 2.
Figure 7 is a fragmentary side elevation of the stem and pole holding arm adapted to serve as a support for the shank of a fishing pole having a reel attachment thereto.
Figure 6:
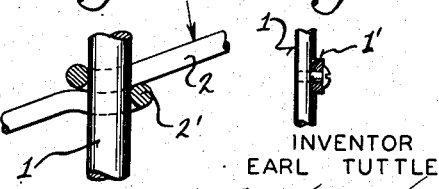
Figure 6 is a detailed sectional view through the ground engaging lower end of the stem particularly illustrating a baffle plate anchor means, the section being indicated by line 6—6 of Figure 1.

The arm 2 is provided with an intermediate circular twist to form a closed friction gripping eye or loop 2', which eye is in slidable engagement with the stem 1, it being noted that the pole and associate loops are to one side of the stem, as best shown in Figure 2 of the drawings. As illustrated in Figure 7 of the drawings, when the shank of the pole, as indicated in dotted lines, is equipped with a standard reel, the front supporting arm may be shorter than the rear arm as shown, whereby the weight of the fishing reel will positively exert a lever action upon the stem, and the encircling eye of said arm will firmly grip the stem and lock the arm in its adjusted position either up or down on said stem.

From the foregoing description, it is obvious that the arm may be adjusted at any desired elevation with reference to the supporting stem 1 and when the weight of the pole with its shank resting in the arm loops is exerted upon said arm, in a lever action, the encircling eye will grip the stem upon at least two faces thereof, whereby a pinching or gripping action is exerted to firmly lock the arm in its adjusted position, it being understood that to raise or lower the arm the same being free from the weight of the pole, it is simply tipped to relieve the friction grip upon the stem.

It will be noted that the intermediate twisted loop 2' develops the arm 2 into two sections which are tangentially offset from the loop and are aligned. Hence when a pole is inserted in the reverse loops 3—3', the weight thereof, which is offset from the stem, will develop biting pressures transversely of the loop, and also longitudinally of said loop, to insure proper gripping of the pole to prevent slipping thereof upon said stem.

It will also be noted that the baffle plate which is embedded in the soil will prevent twisting of the stem when the line of the fisherman has been struck by a fish, which might otherwise result in twisting of the rod.

I claim:

A fish rod support comprising a vertically disposed anchor stem, an arm having an intermediate twisted loop therein, the arm sections being tangentially extended from the twisted loop and upon the same plane, the end of one of the arm sections being obliquely extended downwardly and the other end obliquely extended upwardly to form reversely disposed open loops, whereby the same are adapted to engage the upper and lower faces of the pole, the arm sections being offset from the twisted loop, whereby the weight of the pole nested in the arm loops will exert a downward side gripping pressure upon the stem and also an oblique horizontally disposed bite upon said stem.

EARL TUTTLE.

REFERENCES CITED

The following references are of record in the file of this patent:

UNITED STATES PATENTS

| Number | Name | Date |
|---|---|---|
| 961,234 | Hoover | June 14, 1910 |
| 1,447,579 | Thomas | Mar. 6, 1923 |
| 1,537,237 | Kaestner | May 12, 1925 |
| 1,753,501 | Christensen | Apr. 8, 1930 |
| 1,912,704 | Graham | June 6, 1933 |